United States Patent Office 3,337,600
Patented Aug. 22, 1967

3,337,600
CHLOROPHENYL AND NITROPHENYL N-(CHLOROACETYL) CARBAMATES
Angelo John Speziale, Creve Coeur, and Lowell R. Smith, St. Louis, Mo., assignors to Monsanto Company, St. Louis, Mo., a corporation of Delaware
No Drawing. Original application Sept. 4, 1962, Ser. No. 221,301, now Patent No. 3,213,135, dated Oct. 19, 1965. Divided and this application May 13, 1965, Ser. No. 455,631
4 Claims. (Cl. 260—455)

This application is a division of copending application Ser. No. 221,301, filed Sept. 4, 1962, and now U.S. 3,213,135.

This invention relates to a novel process whereby new and useful chloroacetyl isocyanates of the formula

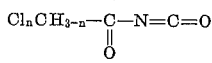

wherein $n$ is a whole number from 1 to 3 are made.

The chloroacetyl isocyanates of this invention are prepared by heating under anhydrous conditions to effect evolution of hydrogen chloride a mixture of one mole of a chloroacetamide of the formula

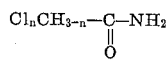

wherein $n$ is a whole number from 1 to 3 and at least one mole of oxalyl chloride in the presence of an inert organic liquid, and thereafter distilling from the reaction mass said chloroacetyl isocyanate.

A wide range of reaction conditions can be employed in preparing these chloroacetyl isocyanates provided the reaction conditions result in the evolution of hydrogen chloride which is a by-product of the reaction. In general it is preferable to reflux the reaction mixture and while refluxing to remove the hydrogen chloride as it forms. Refluxing temperatures in the range of from about 35° C. to about 100° C. have been found highly desirable. With respect to pressure either pressures above or below atmospheric pressure can be employed, however in general it is satisfactory to employ atmospheric pressure.

Although theoretically the amide reactant and oxalyl chloride combine in equimolecular amounts to produce the desired isocyanate it is advantageous to employ an excess of oxalyl chloride, for example up to about two moles per mole of amide.

The inert organic liquid employed in the process of this invention will be a liquid alkane or a liquid chlorine substituted alkane or mixtures thereof, e.g. n-pentane, n-hexane, 2-methylpentane, 3-methylpentane, n-heptane, 2-methylhexane, dichloromethane, 1,1-dichloroethane, 1,2-dichloroethane, chloroform, carbon tetrachloride, isobutyl chloride, and mixtures thereof. In general it is preferable that the amount of said inert organic liquid present throughout the course of the reaction be that at least sufficient to maintain the chloroacetyl isocyanate produced in solution.

The chloroacetyl isocyanates prepared in accordance with the process of this invention include α-chloroacetyl isocyanate, α,α-dichloroacetyl isocyanate and α,α,α-trichloroacetyl isocyanate. These materials are readily hydrolyzed and therefore when stored should be kept free of moisture, as for example stored under refrigerative conditions either as such or dissolved in an anhydrous inert solvent.

These chloroacetyl isocyanates react with a variety of compounds to provide a large number of useful compounds. For example the reacting of equimolecular proportions of the chloroacetyl isocyanate (1) and an aliphatic alcohol or aliphatic mercaptan of the formula RXH wherein X is sulfur or oxygen and wherein R is a $C_{1-5}$ aliphatic hydrocarbyl radical (e.g. methyl, ethyl, isopropyl, amyl, allyl, butenyl, propynyl, etc.) or a chlorine substituted $C_{1-5}$ aliphatic hydrocarbyl radical (e.g. 2-chloroethyl, 2,3-dichloropropyl, 2-chloroallyl, 3-chlorobut-2-enyl, etc.) provides esters of the formula

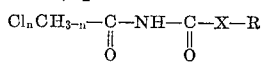

which esters are useful as herbicides, e.g. at an application rate of 25 pounds per acre methyl N-(α,α,α-trichloroacetyl)carbamate (M.P. 105–106° C.) exhibited excellent preemergent control of such narrow leaf plants as brome grass, rye grass, foxtail, crab grass and sorghum. Other useful esters so obtainable from the appropriate alcohol or mercaptan include isopropyl N-(α-chloroacetyl)carbamate (M.P. 101–102° C.), methyl N-(α,α-dichloroacetyl)thiolocarbamate, 2-chloroallyl N-(α,α,α-trichloroacetyl)carbamate, etc. (2) and a substituted phenol or thiophenol such as the various chlorophenols, chlorothiophenols and nitrophenols provides esters of the formula

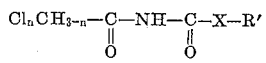

wherein X is sulfur or oxygen and wherein R' is a phenyl radical having one or more chloro and/or nitro substituents which esters are useful as herbicides, e.g. at an application rate of 25 pounds per acre 4-chlorophenyl N-(α,α,α-trichloroacetyl)carbamate (M.P. 155–157° C.) exhibited excellent contact herbicidal control of narrow leaf and broad leaf plants (3) and a primary or secondary amine of the formula A—NH—B wherein A is hydrogen or a $C_{1-5}$ aliphatic radical (e.g. methyl, ethyl, isopropyl, amyl, allyl, propynyl, 2-chloroethyl, 2-chloroallyl, etc.) or a phenyl radical or an alkyl substituted phenyl radical or chlorine substituted phenyl radical and wherein B is a $C_{1-5}$ aliphatic radical (e.g. methyl, ethyl, isopropyl, amyl, allyl, propynyl, 2-chloroethyl, 2-chloroallyl, etc.) or a phenyl radical or an alkyl substituted phenyl radical or a chlorine substituted phenyl radical provides substituted ureas of the formula

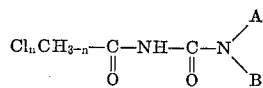

which esters are useful as herbicides, e.g. at an application rate of 25 pounds per acre excellent control of narrow leaf plants is obtained employing N-(α-chloroacetyl)-N'-(3,4-dichlorophenyl) urea (M.P. 160° C.), N-(α,α,α-trichloroacetyl) - N' - (3,4-dichlorophenyl) urea (M.P. 175° C.), N-(α-chloroacetyl)-N'-methyl urea (M.P. 198–200° C.), and N-(α-chloroacetyl)-N'-isopropyl-N'-propynyl urea (M.P. 76–78° C.). Other useful substituted ureas so obtainable from the appropriate amine include N-(α,α,α-trichloroacetyl)-N',N'-diallyl urea, N-(α-chloroacetyl)-N'-allyl urea (M.P. 113–115° C.), N-(α,α-dichloroacetyl)-N'-isopropyl - N' - phenyl urea, N-(α-chloroacetyl)-N',N'-dimethyl urea (M.P. 82–85° C.), etc.

As illustrative of the method of manufacture of the chloroacetyl isocyanates of this invention and the preparation of useful derivatives thereof is the following:

*Example I*

To a suitable reaction vessel equipped with a thermometer, agitator and reflux condenser is charged at room temperature 12.8 parts by weight of α,α-dichloroacetamide, 13.0 parts by weight of oxalyl chloride and 88.2 parts by weight of 1,2-dichloroethane. The so-charged mass is then heated to reflux while agitating then refluxed (about 83° C.) for four hours. Thereafter the resulting mass is subjected to vacuum distillation and the cut (10.45 parts by weight) taken at 135° C. at 35 mm. of mercury is α,α-dichloroacetyl isocyanate, $n_D^{25}$ is 1.4600.

Example I–A

To a suitable reaction vessel is charged 3.1 parts by weight of α,α-dichloroacetyl isocyanate dissolved in 25 parts by weight of dichloromethane. While maintaining the temperature at about 0° C. and with agitation there is added 3.2 parts by weight of 3,4-dichloroaniline dissolved in 25 parts by weight of dichloromethane. The solution is then concentrated by boiling off the excess dichloromethane. To the so concentrated solution is added sufficient hexane to precipitate the dissolved solids. The precipitate is filtered off and dried. The dried product (5.8 parts by weight) is N-(α,α-dichloroacetyl)-N'-(3,4-dichlorophenyl) urea which after recrystallization is found to melt at 157–159° C.

*Analysis.*—Theory, 8.86% N, 44.88% Cl; found, 8.90% N, 45.25% Cl.

Example I–B

Employing the procedure of Example I–A but replacing 3,4-dichloroaniline with an equimolecular amount of dimethylamine there is obtained N-(α,α-dichloroacetyl)-N',N'-dimethylurea.

Example II

To a suitable reaction vessel equipped with a thermometer, agitator and reflux condenser is charged at room temperature 16.2 parts by weight of α,α,α-trichloroacetamide, 101 parts by weight of 1,2-dichloroethane, and 12.7 parts by weight of oxalyl chloride. With agitation the so-charged mass is heated to reflux and refluxed (about 80° C.) for twenty-four hours. Thereafter the resulting mass is subjected to vacuum distillation and the cut (11.3 parts by weight) taken at 80–85° C. at 20 mm. of mercury is α,α,α-trichloroacetyl isocyanate, $n_D^{25}$ is 1.4755.

Example II–A

To a suitable reaction vessel is charged 3.8 parts by weight of α,α,α-trichloroacetyl isocyanate dissolved in 25 parts by weight of dichloromethane. While maintaining the temperature at about 0° C. and with agitation is added 3.2 parts by weight of 3,4-dichloroaniline dissolved in 25 parts by weight of dichloromethane. The solution is then concentrated by boiling off the excess dichloromethane. To the so concentrated solution is added sufficient hexane to precipitate the dissolved solids. The precipitate is filtered off and dried. The dried product (5.6 parts by weight) is N-(α,α,α-trichloroacetyl) - N' - (3,4-dichlorophenyl) urea which after recrystallization is found to melt at 175° C.

*Analysis.*—Theory, 8.00% N, 50.59% Cl; found, 8.11% N, 50.68% Cl.

Example II–B

To a suitable reaction vessel is charged 50 parts by weight of anhydrous methanol. While maintaining the temperature at about 0° C. and with agitation is added dropwise 3.8 parts by weight of cold α,α,α-trichloroacetyl isocyanate. The mass is evaporated to dryness in vacuo and the residue recrystallized from a dichloromethane-hexane mixture and dried. The dried product (44 parts by weight) is methyl N-(α,α,α-trichloroacetyl)carbamate which material melts at 105–106° C.

Example III

To a suitable reaction vessel equipped with a thermometer, agitator and reflux condenser is charged 56.1 parts by weight of α-chloroacetamide, 81 parts by weight of oxalyl chloride and 88.2 parts by weight of 1,2-dichloroethane. With agitation the so-charged mass is heated to reflux and refluxed (about 83° C.) for two hours. Thereafter the reaction mass is subjected to vacuum distillation and the cut (46.0 parts by weight) taken at 50–55° C. at 20 mm. is α-chloroacetyl isocyanate, $n_D^{25}$ is 1.4580.

Example III–A

To a suitable reaction vessel is charged 2.4 parts by weight of α-chloroacetyl isocyanate dissolved in 25 parts by weight of dichloromethane. While maintaining the temperature at about 0° C. and with agitation there is added 3.2 parts by weight of 3,4-dichloroaniline dissolved in 25 parts by weight of dichloromethane. The solution is then concentrated by boiling off the excess dichloromethane. To the so concentrated solution is added sufficient hexane to precipitate the dissolved solids. The precipitate is filtered off and dried. The dried product (4.5 parts by weight) is N-(α-chloroacetyl)-N'-(3,4-dichlorophenyl) urea which after recrystallization is found to melt at 160° C.

*Analysis.*—Theory, 9.95% N, 37.78% Cl; found, 9.94% N, 37.72% Cl.

Example III–B

To a suitable reaction vessel is charged 2.4 parts by weight of α-chloroacetyl isocyanate dissolved in 25 parts by weight of cold dichloromethane. While agitating 2.6 parts by weight of 4-chlorophenol is added. The solution is concentrated by boiling off the excess dichloromethane. To the so concentrated solution is added sufficient hexane to precipitate the dissolved solids. The precipitate is filtered off and dried to give 3.6 parts by weight of 4-chlorophenyl N-(α-chloroacetyl)carbamate which after recrystallization is found to have a melting point of 147–149° C.

Example III–C

Employing the procedure of Example III–B but replacing α-chloroacetyl isocyanate with an equimolecular amount of α,α,α-trichloroacetyl isocyanate there is obtained 4 - chlorophenyl N - (α,α,α-trichloroacetyl)carbamate, M.P. 155–157° C.

Example III–D

Employing the procedure of Example III–B but replacing 4-chlorophenol with an equimolecular amount of 4-chlorothiophenol there is obtained as a white solid 4-chlorophenyl N-(α-chloroacetyl)thiolocarbamate.

Example III–E

Employing the procedure of Example III–A but replacing 3,4-dichloroaniline with an equimolecular amount of methyl mercaptan there is obtained methyl N-(α-chloroacetyl)thiolocarbamate, M.P. 134–135° C.

The terminus of the reaction is readily determined by observing the cessation of evolution of hydrogen chloride. In the reaction step between the amide and the oxalyl chloride it is desirable that the inert organic liquid employed have a boiling point below that of the desired isocyanate product. In instances wherein a precipitate forms either in the reaction step or during the distillation operation or any time therebetween it is usually desirable to add sufficient inert organic liquid of any of the aforedescribed types to dissolve the precipitated solids. In recovering the isocyanate product it is preferable to conduct the distillation operation under reduced pressure, e.g. at less than 50 mm. of mercury, and which pressure permits a distillation temperature of not more than 125° C.

While this invention has been described with respect to certain embodiments it is to be understood that it is not so limited and that variations and modifications thereof obvious to those skilled in the art can be made without departing from the spirit or scope of this invention.

What is claimed is:

1. An aryl N-(chloroacetyl)carbamate of the formula

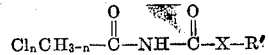

wherein $n$ is a whole number from 1 to 3, wherein X is selected from the group consisting of sulfur and oxygen, and wherein R' is selected from the group consisting of chlorophenyl and nitrophenyl.

2. 4-chlorophenyl N-(α-chloroacetyl)carbamate.
3. 4-chlorophenyl N-(α,α,α-trichloroacetyl)carbamate.
4. S-(4-chlorophenyl) N - (α-chloroacetyl)thiolocarbamate.

References Cited

UNITED STATES PATENTS

| 2,306,599 | 12/1942 | Engel et al. | 260—482 X |
| 2,401,080 | 5/1946 | Kilgore et al. | 167—22 |
| 2,677,698 | 5/1954 | Deutschman et al. | 260—479 |

FOREIGN PATENTS

| 1,081,460 | 5/1960 | Germany. |
| 194,377 | 2/1938 | Switzerland. |

OTHER REFERENCES

Kolbezen et al.: Journal of Argicultural and Food Chemistry, vol. 2, pages 864–870.

LORRAINE A. WEINBERGER, *Primary Examiner.*

CHARLES B. PARKER, *Examiner.*

D. R. MAHANAND, I. R. PELLMAN, K. ROSE,
*Assistant Examiners.*